US011466900B2

(12) United States Patent
Albinmousa et al.

(10) Patent No.: US 11,466,900 B2
(45) Date of Patent: Oct. 11, 2022

(54) DUAL-AXIS HYDRAULIC SYSTEM FOR SOLAR TRACKING

(71) Applicant: King Fahd University of Petroleum and Minerals, Dhahran (SA)

(72) Inventors: Jafar Albinmousa, Dhahran (SA); Ammar Alzaydi, Dhahran (SA); Nahar Hussain Alhajji Ahmed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 472 days.

(21) Appl. No.: 16/577,628

(22) Filed: Sep. 20, 2019

(65) Prior Publication Data

US 2021/0088258 A1  Mar. 25, 2021

(51) Int. Cl.
| | |
|---|---|
| F24S 50/20 | (2018.01) |
| H02S 20/32 | (2014.01) |
| F24S 30/452 | (2018.01) |
| F24S 30/00 | (2018.01) |
| F24S 25/10 | (2018.01) |

(52) U.S. Cl.
CPC ............. *F24S 30/452* (2018.05); *F24S 50/20* (2018.05); *H02S 20/32* (2014.12); *F24S 25/10* (2018.05); *F24S 2030/115* (2018.05); *F24S 2030/15* (2018.05)

(58) Field of Classification Search
CPC .... F24S 30/452; F24S 50/20; F24S 2030/115; F24S 2030/15; H02S 20/32
See application file for complete search history.

(56) References Cited

U.S. PATENT DOCUMENTS

| | | | |
|---|---|---|---|
| 4,172,443 | A | 10/1979 | Sommer |
| 4,172,739 | A | 10/1979 | Tassen |
| (Continued) | | | |

FOREIGN PATENT DOCUMENTS

| | | |
|---|---|---|
| EP | 2 128 540 A1 | 12/2009 |
| EP | 2 557 431 A1 | 2/2013 |
| JP | 5230025 B2 | 3/2013 |

OTHER PUBLICATIONS

AeroTech ; AXR Two-Axis Rotary Assembly ; https://www.aerotech.com/product-catalog/stages/rotary-stage/axr.aspx ; May 13, 2019 ; 16 Pages.

*Primary Examiner* — Thanh Luu
(74) *Attorney, Agent, or Firm* — Oblon, McClelland, Maier & Neustadt, L.L.P.

(57) ABSTRACT

A dual-axis hydraulic joint system includes a vertical shaft, a horizontal shaft, and a hydraulic system. The vertical shaft allows a yaw rotational motion and the horizontal shaft allows a pitch rotational motion, wherein the rotational motion of the vertical shaft and the horizontal shaft is controlled by the hydraulic system. In doing so, the hydraulic system manages a pressure value within a vertical shaft enclosure that holds the vertical shaft, and also manages a pressure value within a horizontal shaft enclosure which holds the horizontal shaft. The pressure value within the vertical shaft enclosure or the horizontal shaft enclosure is either increased or decreased to determine the rotational direction of the vertical shaft or the horizontal shaft. When used for solar panel direction control, the hydraulic system operates according to feedback received from a light-sensor unit, a first encoding unit, and a second encoding unit.

17 Claims, 14 Drawing Sheets

(56) References Cited

U.S. PATENT DOCUMENTS

| | | | |
|---|---|---|---|
| 5,798,517 | A | 8/1998 | Berger |
| 5,929,530 | A * | 7/1999 | Stone .................... G05B 19/232 |
| | | | 290/1 R |
| 6,123,067 | A | 9/2000 | Warrick |
| 7,795,568 | B2 | 9/2010 | Sherman |
| 8,042,534 | B2 | 10/2011 | Choi et al. |
| 8,119,963 | B2 | 2/2012 | Scanlon |
| 8,196,883 | B2 | 6/2012 | Hirschhorn |
| 8,389,918 | B2 | 3/2013 | Oosting |
| 8,513,514 | B2 | 8/2013 | Sherman |
| 2007/0204707 | A1 | 9/2007 | Maffeis |
| 2010/0012113 | A1 | 1/2010 | Martin Barbero |
| 2010/0059045 | A1 | 3/2010 | Guinea Diaz et al. |
| 2010/0175741 | A1 | 7/2010 | Thorne |
| 2011/0219759 | A1 * | 9/2011 | Blitz ....................... H02S 20/10 |
| | | | 60/327 |
| 2013/0118099 | A1 | 5/2013 | Scanlon |
| 2014/0200717 | A1 | 7/2014 | Tilley et al. |
| 2018/0054156 | A1 | 2/2018 | Lokey |

\* cited by examiner

DUAL-AXIS HYDRAULIC SYSTEM FOR SOLAR TRACKING

BACKGROUND

Field of the Invention

The present disclosure is generally related to a sun tracking system and corresponding photovoltaic module that tracks the sun with improved durability. More specifically, the present disclosure describes a dual-axis hydraulic joint that can be used to reduce the overall power consumption of a sun tracking system via a central pressurized hydraulic system and provide dual-axis (yawing and pitching) rotation using hydraulic energy.

Description of the Related Art

Existing sun tracking systems with solar panels utilize electrical actuators or electrical motors to rotate in two different axes. In such systems, for successful sun tracking, the motor and gears related to sun tracking system need to be continuously operated. Cyclic loading and fatigue resulting from the continuous operation can lead to stress concentrations between gears and motors. When cyclic loading is applied, critical parts that usually have geometrical changes or discontinuity like sharp filets, grooves and notches, become prone to failure because the stresses at these parts get amplified. Hence these parts are known as stress raisers. Cycling the stress at these stress raisers causes them to fail (e.g., through fatigue). Therefore, designs that have less number of notches are usually more resistant to fatigue.

Existing sun tracking systems also use rotating pins that can be considered as stress concentration points/weak spots in the overall design of the system. To eliminate weak spots, larger pins are used or a lower number of solar panels are mounted onto each stand. The need for a large quantity of pins to hold a large quantity of solar panels can cause issues in terms of practicality.

To prove the effectiveness of the system of the present disclosure, two prototypes were developed and experimented on. A first prototype comprises a gear and motor system, wherein the cyclic loads applied to the first prototype resulted in fatigue type failures and showed clear effects of stress concentration failures. The fatigue type failures and the stress concentration failures requires the components of the first prototype to be constantly maintained and replaced. However, fatigue and stress concentration are not two different things. As explained earlier, fatigue is damage (progressive deterioration of material due to the application of cyclic loading) whereas stress concentration is state of high stress that is confined to a small region (points) on a part or a component. The concentration of the stress is due to the existence of geometrical discontinuities or abrupt change in the shape. For a system such as the first prototype to be self-locking, energy needs to be constantly supplied to the motor to make sure no movement takes place. The high demand of energy is another disadvantage related to the first prototype. On the other hand, when a single axis hydraulic joint prototype is used, the stress concentrations related to motors and gears are eliminated. Thus, failures related to fatigue are also eliminated which increases the ability of the system of the present disclosure to load more solar panels on one stand. Since the hydraulic joint prototypes are self-locking when not actuated, energy is conserved when the prototype is stationary. FIGS. 1A-1D illustrate the effect of stress concentrations and fatigue failures. FIGS. 2A-2C illustrate the second prototype, wherein a single-axis hydraulic joint is illustrated.

In view of the difficulties and drawbacks of the existing sun tracking systems, it is one objective of the present disclosure to provide a sun tracking system that eliminates stress concentration points, eliminates the need for larger components, and reduces the overall power consumption. Moreover, by utilizing the system of the present disclosure, the need to maintain parts and replace parts is also significantly reduced.

SUMMARY OF THE INVENTION

The system described in the present disclosure comprises a hydraulic system, a vertical shaft, and a horizontal shaft, wherein the hydraulic system is used to control the rotational movement of the vertical shaft within a vertical shaft enclosure and the rotational movement of the horizontal shaft within a horizontal shaft enclosure. In order to do so, the hydraulic system manages a pressure within the vertical shaft enclosure and a pressure within the horizontal shaft enclosure. In particular, the vertical shaft corresponds to a yaw rotation and the horizontal shaft corresponds to a pitch rotation. The vertical shaft enclosure and the horizontal shaft enclosure are mechanically engaged to each other to provide a dual-axis range of motion for the system.

In order to adjust the system of the present disclosure according to different sun positions, the system of the present disclosure further comprises a light-sensor unit, at least one microcontroller, and at least one proportional-integral-derivative (PID) controller. The light sensor unit provides a sun position signal to be processed at the microcontroller and transferred to the PID controller. Next, the PID controller proceeds to control the vertical shaft and horizontal shaft to match the sun position signal. By doing so, an external attachment mounted to the vertical shaft and/or the horizontal shaft can be oriented to match the sun position detected by the light-sensor unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
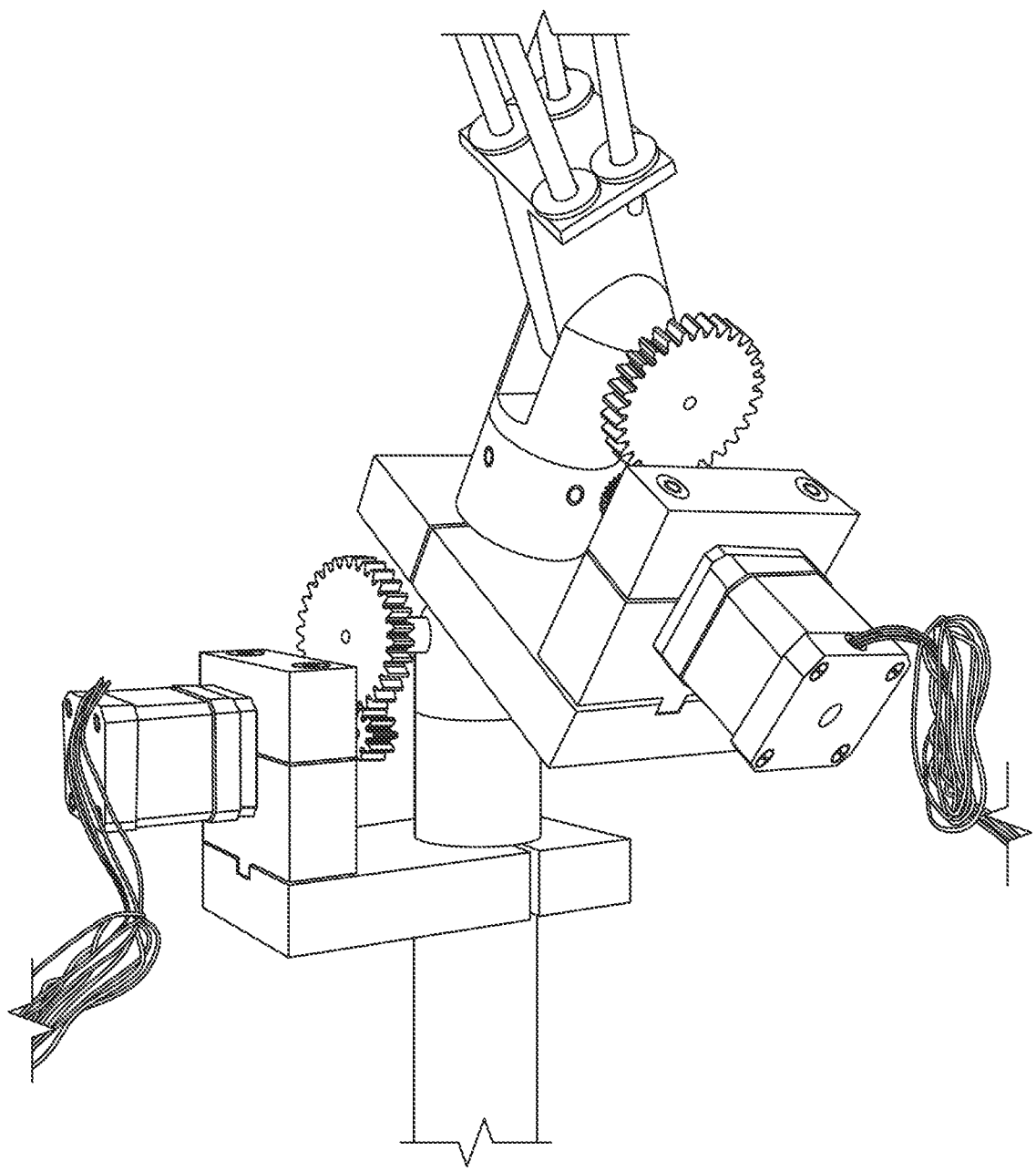
FIG. 1A is a photograph of a conventional sun-tracking system, wherein gears and motors are used.
Figure 1B:
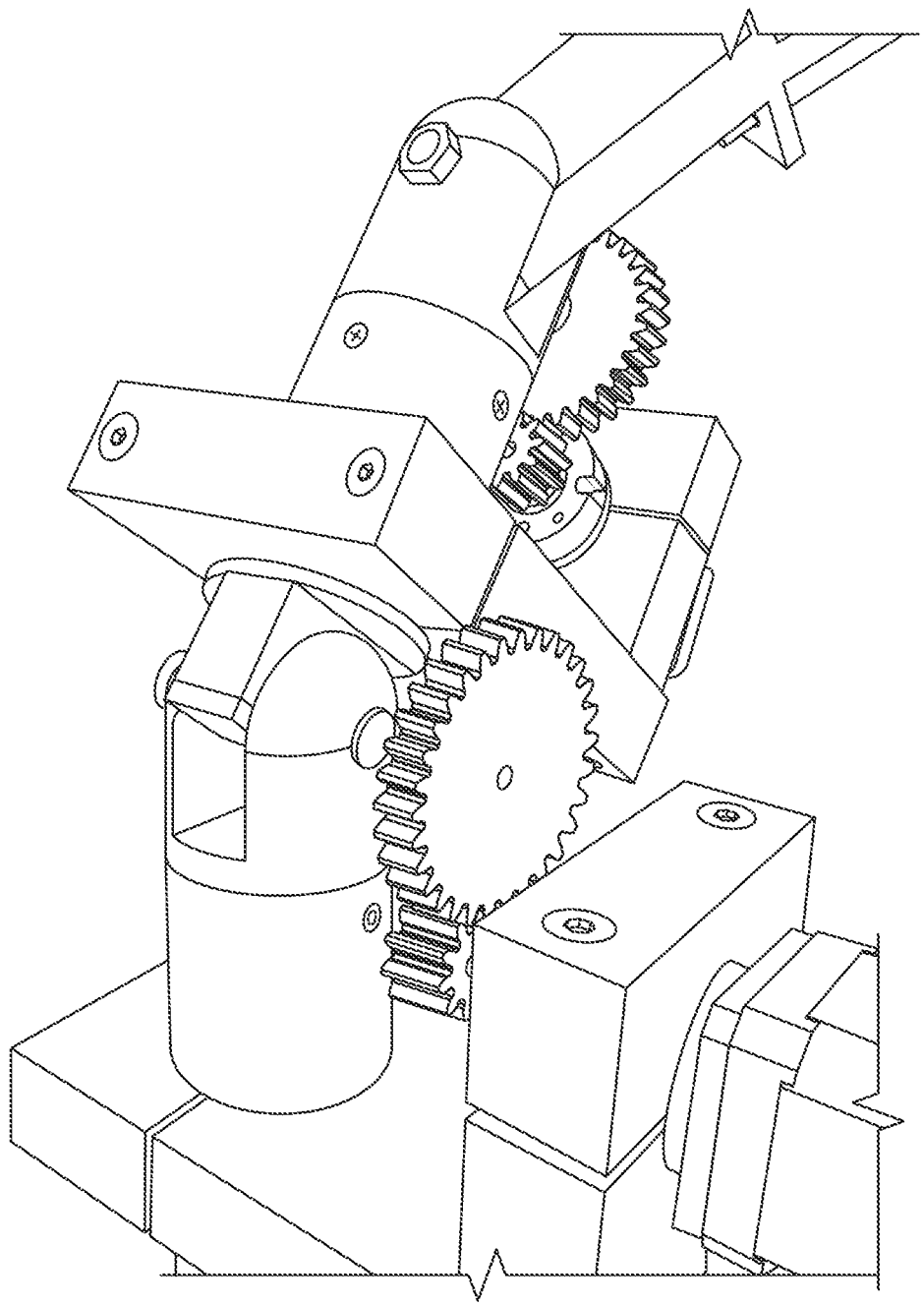
FIG. 1B is another photograph of the conventional sun-tracking system, wherein gears and motors are used.
Figure 1C:
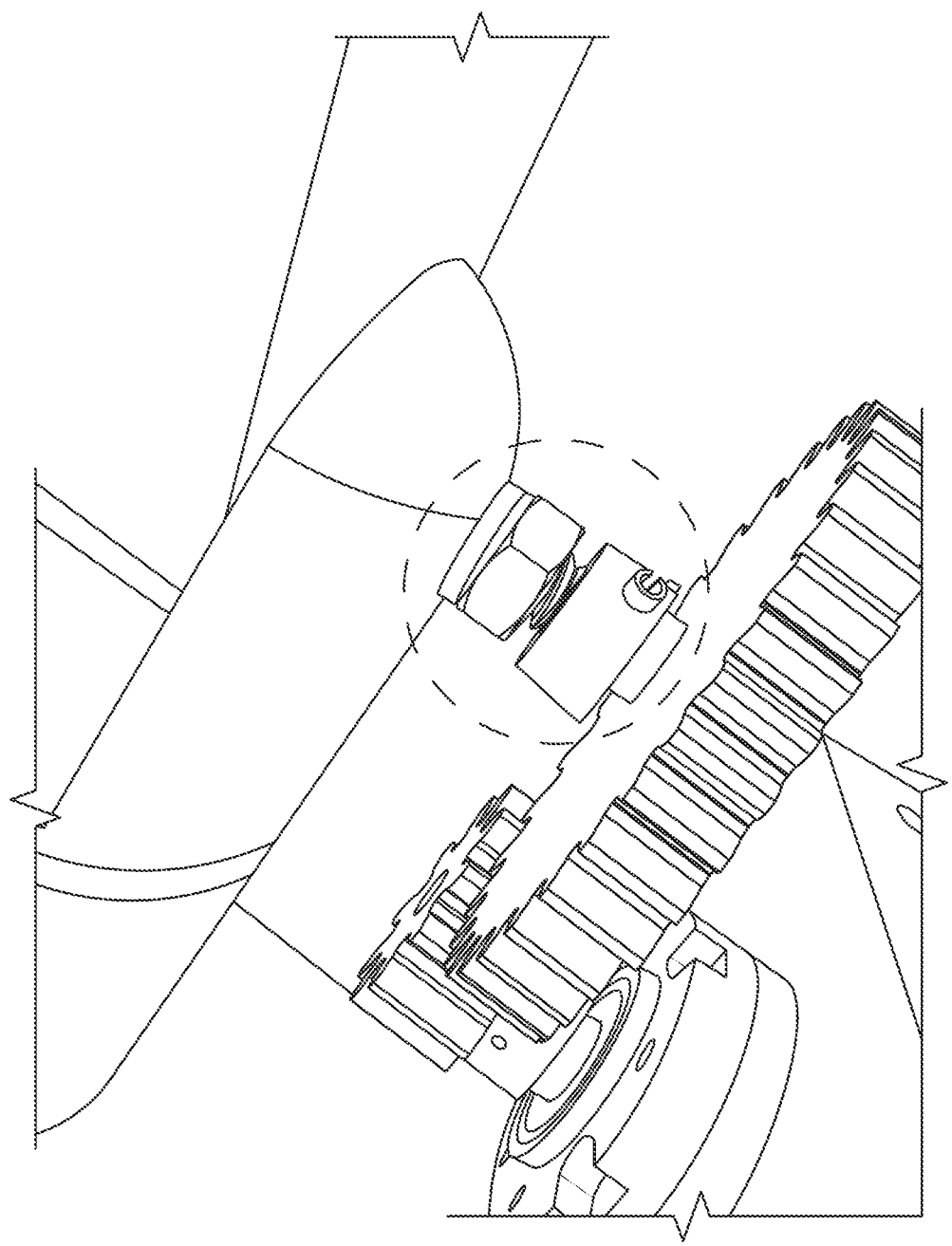
FIG. 1C is a photograph illustrating the effects of stress concentrations and fatigue failures, wherein conventional gears and motors are used.
Figure 1D:
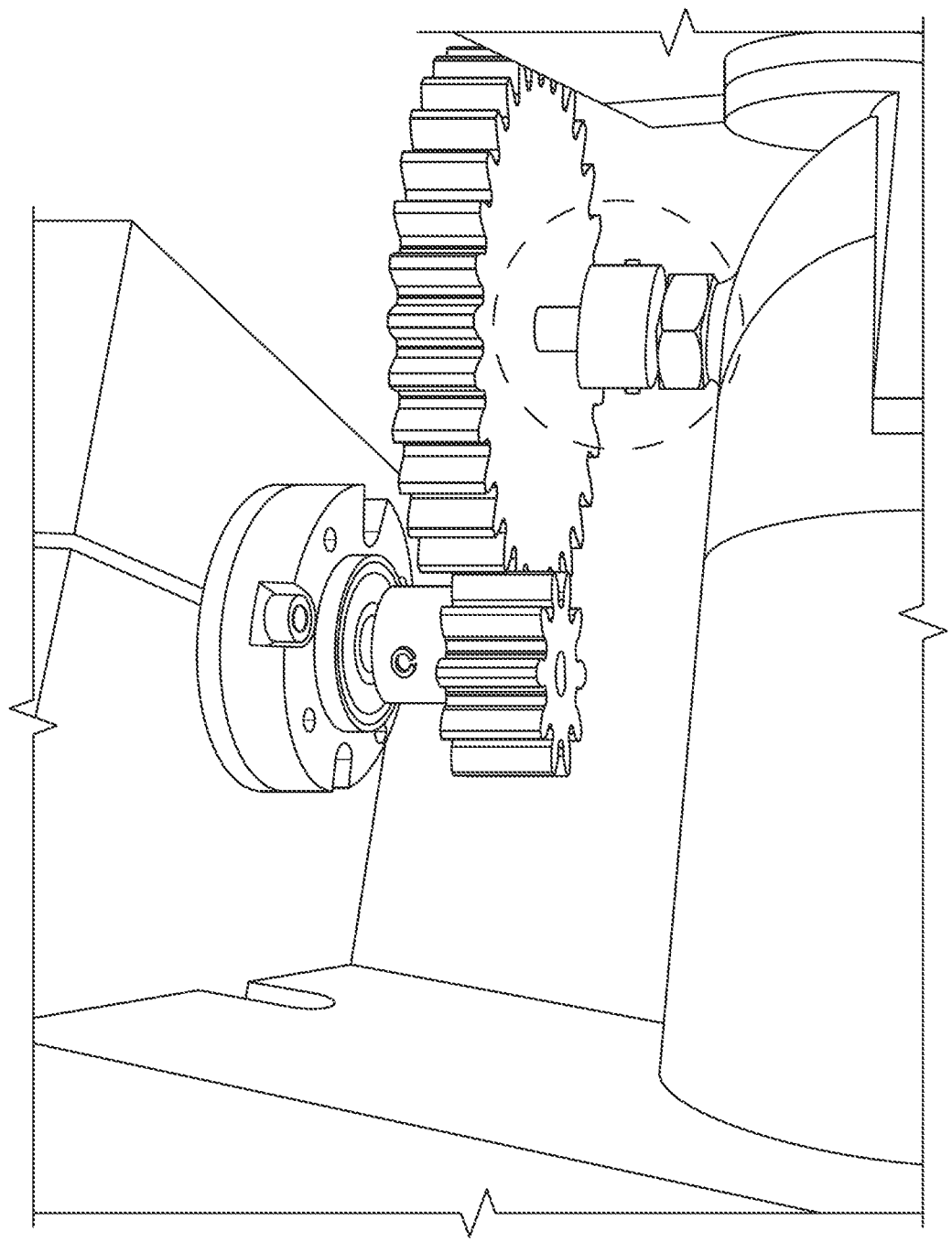
FIG. 1D is another photograph illustrating the effects of stress concentrations and fatigue failures, wherein conventional gears and motors are used.
Figure 2A:
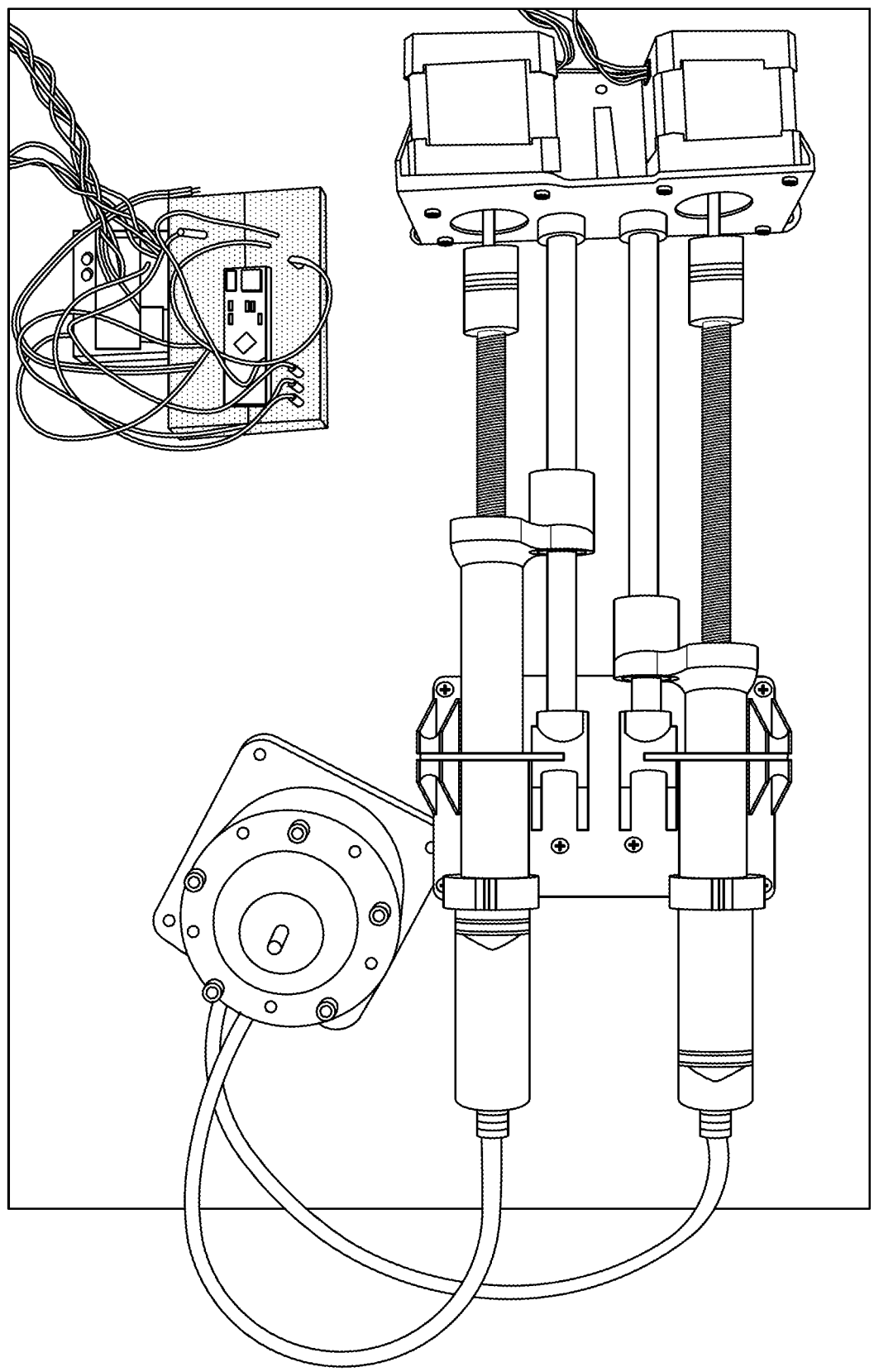
FIG. 2A is a photograph of a single-axis hydraulic joint system, wherein the connection between the hydraulic system and a shaft enclosure of the single-axis is shown.
Figure 2B:
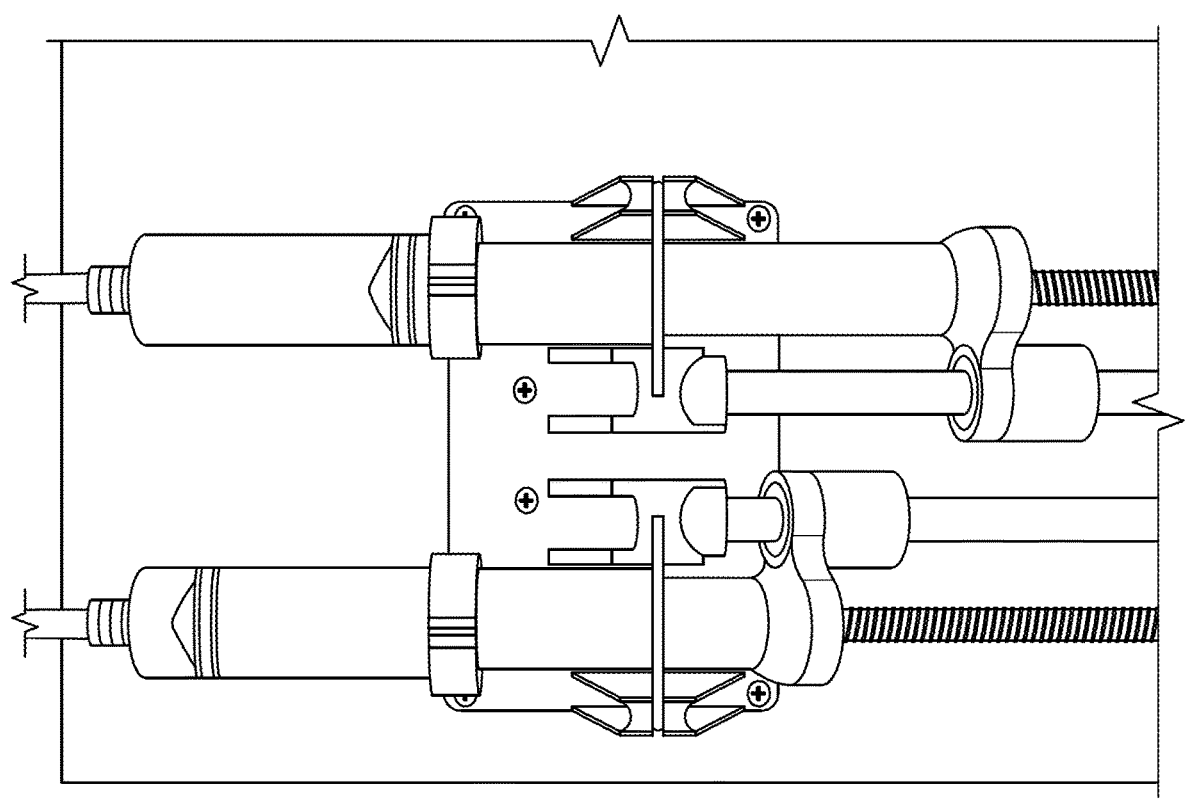
FIG. 2B is a photograph of the accumulator of the hydraulic system used in the single-axis hydraulic joint system.
Figure 2C:
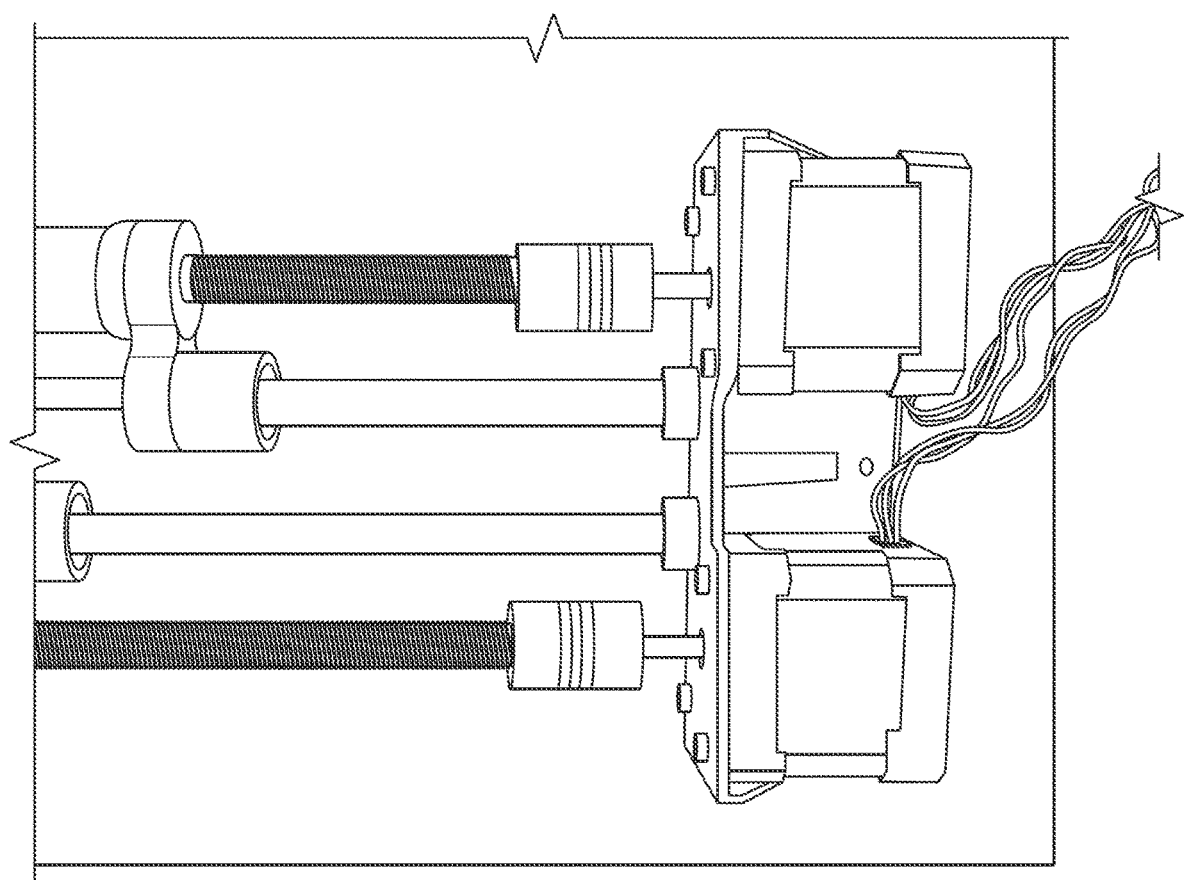
FIG. 2C is a photograph of hydraulic pump of the hydraulic system used in the single-axis hydraulic joint system.
Figure 2D:
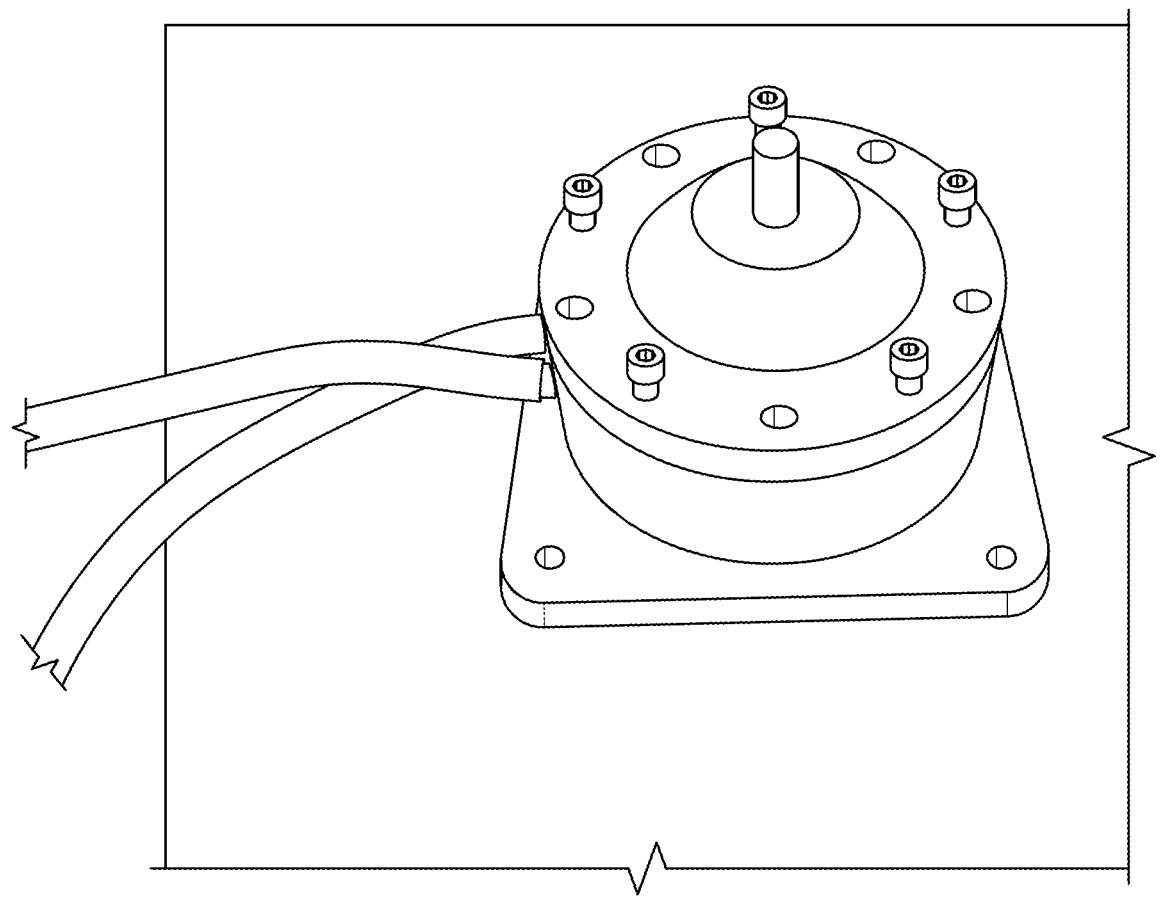
FIG. 2D is a photograph of the shaft enclosure of the single-axis.

All illustrations of the drawings are for the purpose of describing selected embodiments of the present disclosure and are not intended to limit the scope of the present disclosure or accompanying claims.

The present disclosure describes a dual-axis hydraulic joint used for solar tracking, wherein the dual-axis hydraulic joint can reduce power consumption and increase the power efficiency. To do so, the system of the present disclosure uses a central pressurized hydraulic system for control purposes instead of an individual electrical slewing system.

In addition to being used for solar tracking, the system described in the present disclosure can also be used in fields that can be, but are not limited to, renewable energy, slewing systems, direction control for satellite or radar dishes, rotating lifting systems, steering systems in the manufactory, and other comparable applications where maintenance is expensive or infeasible. The system of the present disclosure can also be used with applications that have a tendency to fail under stress concentration points.

In particular, the present disclosure describes a system that rotates between two axes while eliminating the possibility of stress concentration points. Moreover, the system of the present disclosure also eliminates the need to increase the thickness, size, or number of elements in order to increase the number of solar panels attached to the joint. Even though solar panels are attached to the system in a preferred embodiment, the system of the present disclosure can also be used with satellite or radar dishes and rotating lift systems.

The system of the present disclosure, which is used for solar-tracking purposes in a preferred embodiment, includes a dual-axis hydraulic joint that permits rotational motion using hydraulic pressure force. Moreover, the solar panels attached during solar-tracking purposes can be controlled via stored energy. The energy is stored in the accumulator through, for example, an air compressor that pressurizes the amount of hydraulic fluid to be supplied to the hydraulic joints whenever is required. After running the solar panels, the air compressor will pressurize the air "compressible fluid" inside the accumulator, until reaching a predetermined gauge-pressure, which contains the hydraulic fluid "non-compressible fluid". After that, the hydraulic fluid is pressurized and is ready to move the hydraulic joints.

Although, the level of the hydraulic fluid can be controlled and after certain operations, the hydraulic fluid pump will provide the required amount of the hydraulic fluid and at the same time it will pressurize the accumulator. This stored hydraulic energy can be used to supply multiple sets of hydraulic dual axis joints for example in a solar panel plant or array instead of using individual hydraulic sources. Thus, the overall power consumption is reduced and the power efficiency is increased in the tracking system.

The low cost associated with the components, such as the radial and thrust bearings, is financially beneficial to a user when compared to other components such as slewing rings that are manufactured with computer numerical control (CNC). The accuracy of the system of the present disclosure is reliable since a proportional-integral-derivative (PID) controller and at least one angular position encoder are used. The system can also be used with any open-loop or closed loop type of controller. Moreover, by not using rotating pins, the system of the present disclosure reduces structural limitations that exist with traditional solar tracking systems. The overall design of the system described in the present disclosure ensures that a different rotational axis can be used without changing the internal parts and concept design.

Figure 3A:
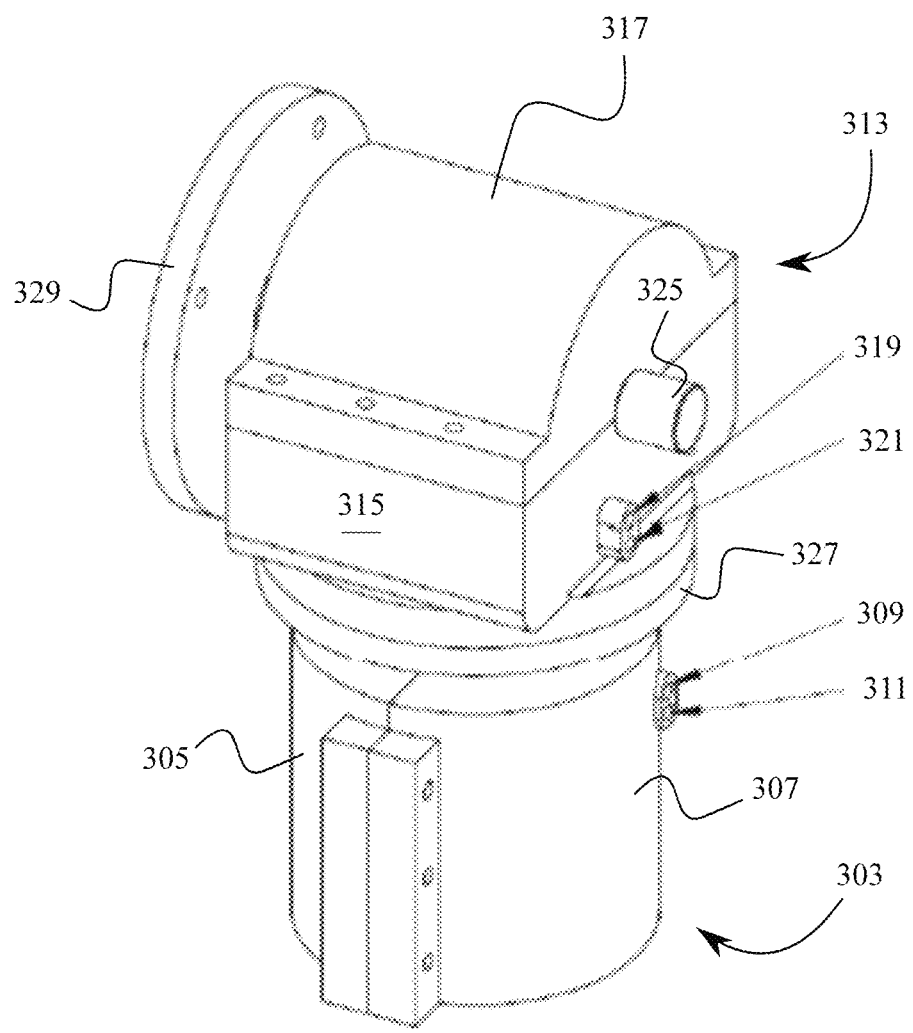
FIG. 3A is a perspective view of the device described in the present disclosure, wherein the vertical shaft enclosure and the horizontal shaft enclosure are illustrated.
Figure 3B:
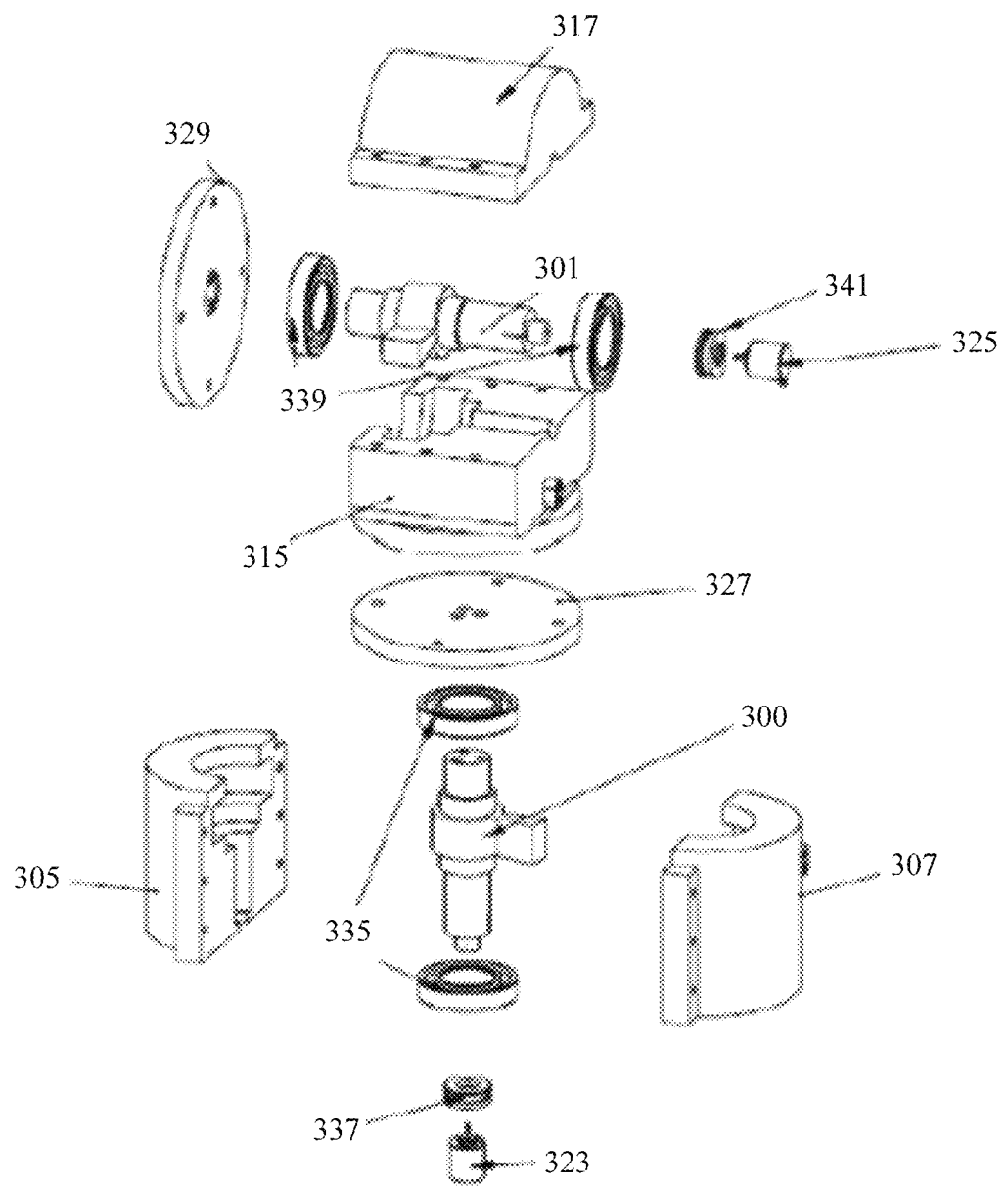
FIG. 3B is a perspective exploded view of the device described in the present disclosure.
Figure 6:
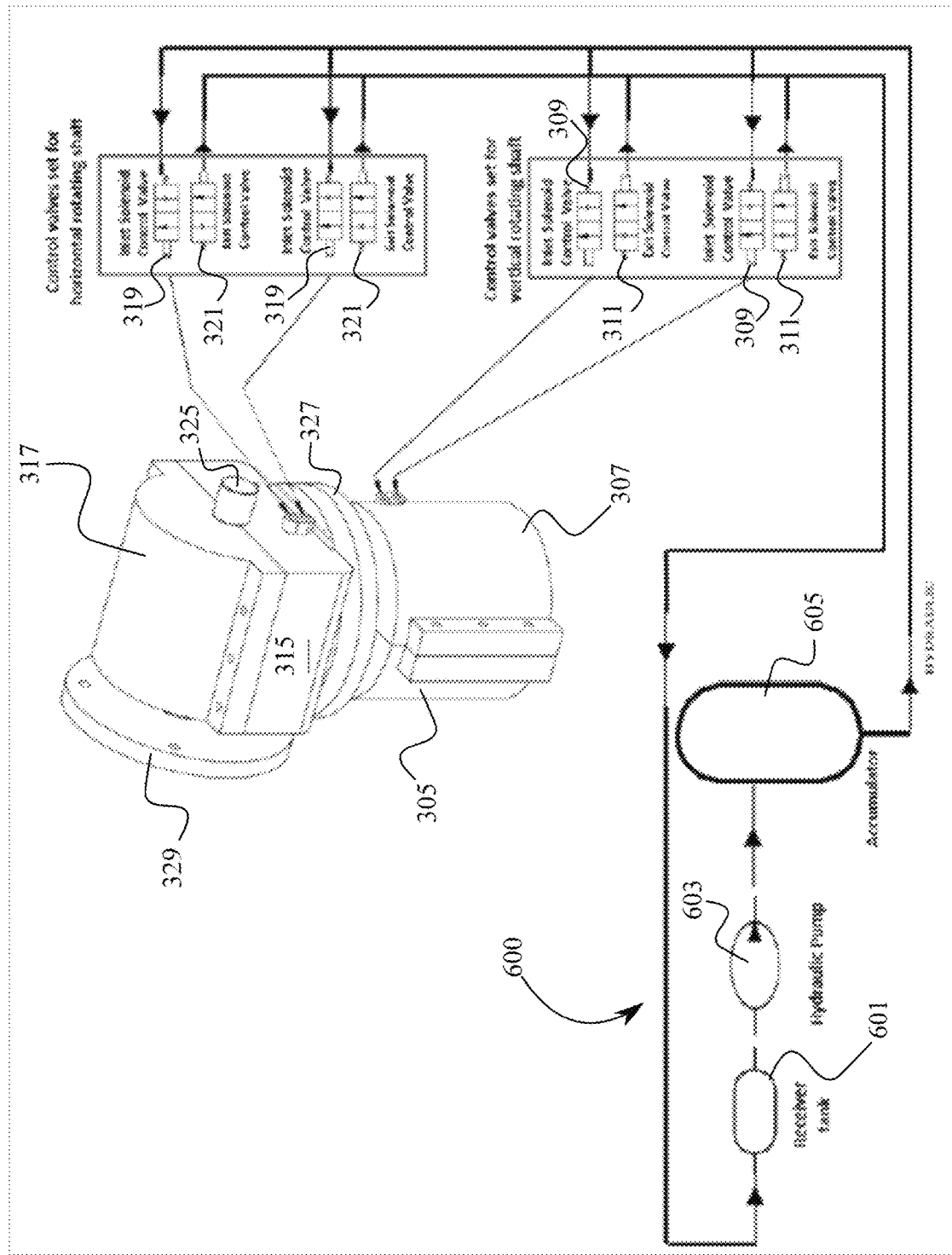
FIG. 6 is a schematic diagram showing the connection between the hydraulic system and the device of the present disclosure.

To fulfill the intended functionalities, as seen in FIG. 3B and FIG. 6, the system of the present disclosure comprises a vertical shaft 300, a horizontal shaft 301, and a hydraulic system 600. The size and shape of the vertical shaft 300 and the horizontal shaft 301 can vary from one embodiment to another. The vertical shaft 300 corresponds to a yaw rotation and the horizontal shaft 301 corresponds to a pitch rotation. Thus, when an external attachment which can be, but is not limited to, a solar panel is used with the system of the present disclosure, a desirable position can be obtained for the external attachment by rotating the vertical shaft 300 and the horizontal shaft 301. The hydraulic system 600, which is a pressurized hydraulic system, is used for controlling the rotational movement of both the vertical shaft 300 and the horizontal shaft 301 by controlling the hydraulic pressure applied on the vertical shaft 300 and/or the horizontal shaft 301. The specifications of the hydraulic system 600 can vary. For example, in one embodiment the primary energy source driving the hydraulic pump 603 can be from an internal combustion engine. In another embodiment, the primary energy source can be from a direct current (DC) motor that is powered through DC batteries. In a different embodiment, the primary energy source for the hydraulic system 600 can be from a 3-phase alternating current (AC) motor. In another embodiment, an axial piston pump can be used as a hydraulic motor. In one example the mechanism that is used to drive the hydraulic pump of the hydraulic system is powered using sun heat system. Thus an external sustainable energy source provides the energy required to pressurize the accumulator that uses the heat exchanger pump. Alternatively, a hydrogen power generator can be used to provide the required energy to run the compressor or the hydraulic pump.

Figure 5:
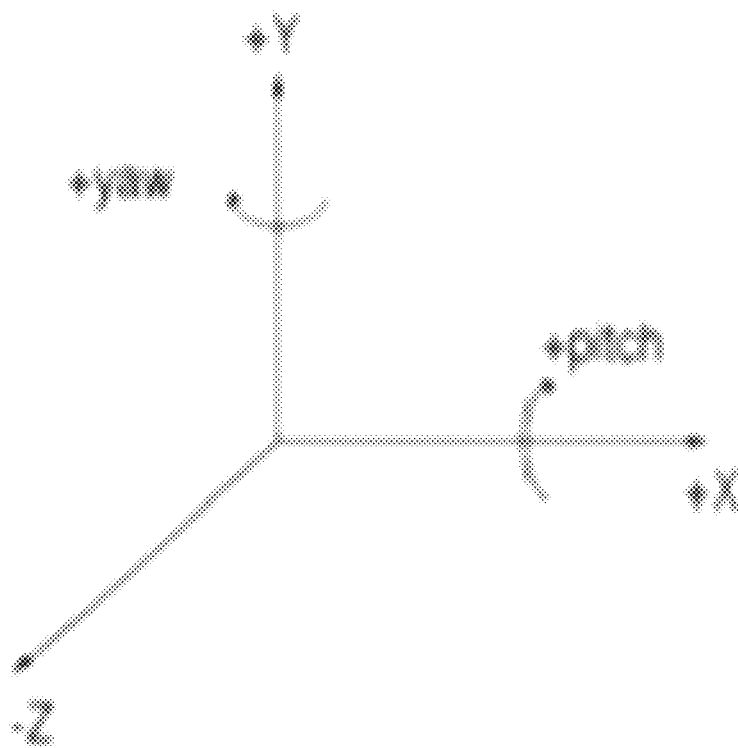
FIG. 5 is an illustration of the yaw rotation corresponding to the vertical shaft and the pitch rotation corresponding to the horizontal shaft.

The vertical shaft 300 is rotatably positioned within a vertical shaft enclosure 303, wherein the overall shape and size of the vertical shaft enclosure 303 can vary. By being rotatably positioned, the vertical shaft 300 is allowed to perform the yaw rotation, wherein the vertical shaft 300 rotates about a vertical axis as seen in FIG. 5.

On the other hand, the horizontal shaft 301 is rotatably positioned within a horizontal shaft enclosure 313, wherein the overall size and shape of the horizontal shaft enclosure 313 can also vary. By being rotatably positioned, the horizontal shaft 301 is allowed to perform the pitch rotation, wherein the horizontal shaft 301 rotates about a horizontal axis as seen in FIG. 5.

The rotational movement of the vertical shaft 300 within the vertical shaft enclosure 303 is controlled by increasing or decreasing the pressure within the vertical shaft enclosure 303. On the other hand, the rotational movement of the horizontal shaft 301 is controlled by increasing or decreasing the pressure within the horizontal shaft enclosure 313.

Figure 4:
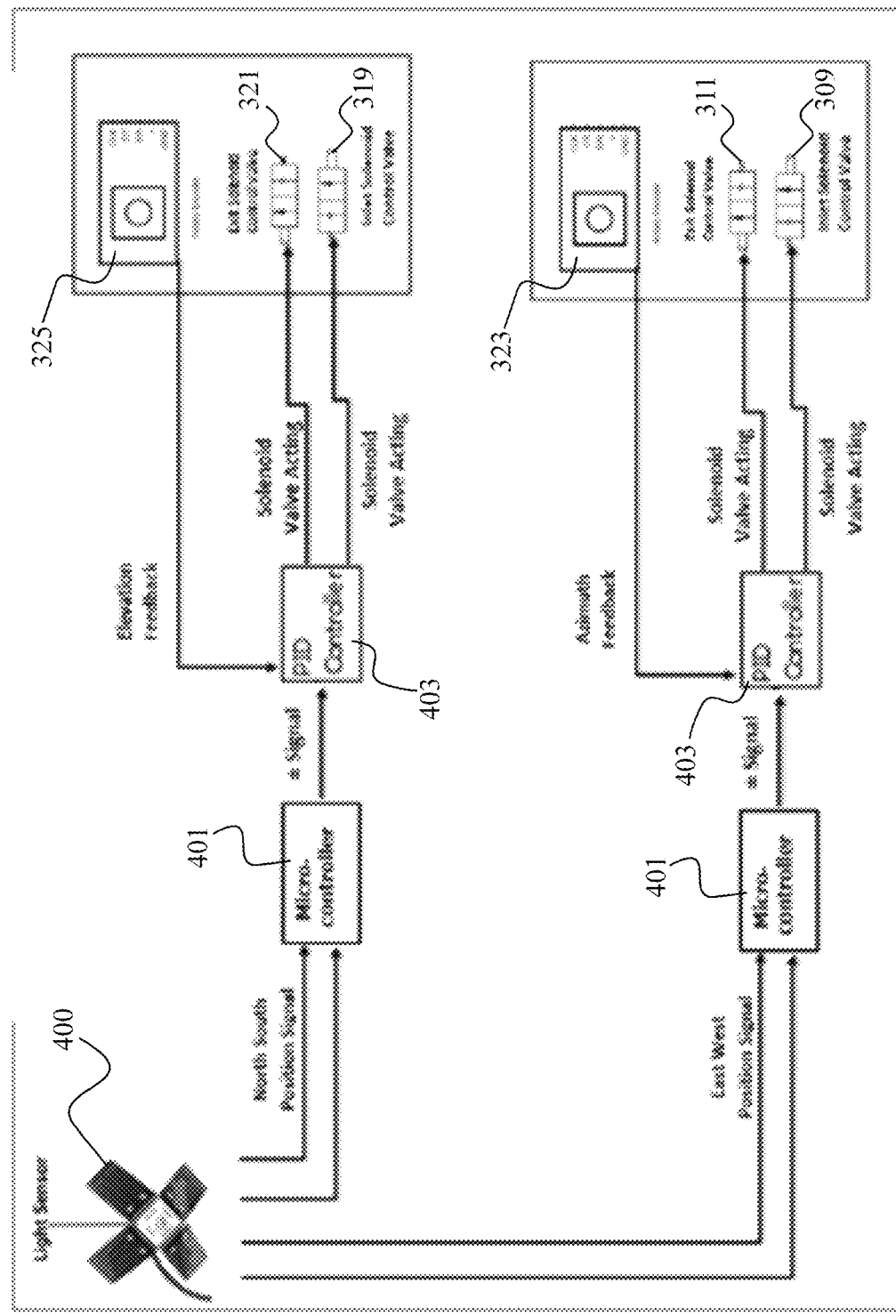
FIG. 4 is a block diagram illustrating the light sensor unit, the at least one microcontroller, and the at least one proportional-integral-derivative (PID) controller of the system described in the present disclosure.

To control the rotational movement of the vertical shaft 300 within the vertical shaft enclosure 303, a pressure applied on the vertical shaft 300 and a fluid flow into the vertical shaft enclosure 303 is managed by the hydraulic system 600. A hydraulic pressure force which enters on the desired side of a sealed chamber translates the pressure and fluid flow to rotational movement on the vertical shaft 300. As seen in FIG. 3A and FIG. 4, to continuously get updates regarding the position of the vertical shaft 300, a first encoding unit 323, which is preferably a rotary encoder, is operatively coupled and terminally connected to the vertical shaft 300. However, in a different embodiment, the first encoding unit 323 can be positioned in a non-rotating position and still be used for monitoring the vertical shaft 300.

Similarly, to control the rotational movement of the horizontal shaft 301 within the horizontal shaft enclosure 313, a pressure applied on the horizontal shaft 301 and a fluid flow into the horizontal shaft enclosure 313 is managed by the hydraulic system 600. A hydraulic pressure force which enters on the desired side of a sealed chamber translates the pressure and fluid flow to rotational movement on the horizontal shaft 301. To continuously get updates regarding the position of the horizontal shaft 301, a second encoding unit 325 is terminally connected to the horizontal shaft 301. Similar to the first encoding unit 323, the second encoding unit 325 is also preferably a rotary encoder. This configuration permits a rotational movement capability. The forces can be varied by reduction or addition of pressure, e.g., by adding a potential rotational energy, such as rotational springs or adjustable cantilever weight on the other said of rotating, that reduce the equilibrium rotational force.

The vertical shaft enclosure 303 and the horizontal shaft enclosure 313 are mechanically engaged to each other such that a preferred operating position can be obtained by managing both the vertical shaft 300 and the horizontal shaft 301. By utilizing a rotary encoder, which is also known as a shaft encoder, as the first encoding unit 323 and the second encoding unit 325, an angular position or motion of a shaft or axle can be converted into analog or digital output signals.

A rotary encoder can be either an absolute encoder or an incremental encoder. The system of the present disclosure can utilize either the absolute or the incremental encoder type. An absolute encoder indicates a current shaft position such that the absolute encoder functions as an angle transducer, wherein an angle transducer is a device that converts one form of energy to another. The absolute encoder maintains position information when power is removed from the encoder. The position of the encoder is available immediately upon applying power. The relationship between the encoder value and the physical position of the controlled machinery is set at assembly and the system does not need to return to a calibration point to maintain position accuracy. An absolute encoder has multiple code rings with various binary weightings which provide a data word, which is a natural unit of data corresponding to the processor in use. The multiple code rings represent the absolute position of the encoder within one revolution, and such encoders are often referred to as parallel absolute encoders.

A multi-turn absolute rotary encoder includes additional code wheels and gears. A high-resolution wheel measures the fractional rotation, and lower-resolution geared code wheels record the number of whole revolutions of the shaft. With reference to the system of the present disclosure, if an absolute encoder was used in the first encoding unit 323 and the second encoding unit 325, the absolute encoder will indicate the current shaft position of the vertical shaft 300 and the horizontal shaft 301.

On the other hand, the incremental encoder will provide information regarding the motion, such as position, speed, and distance, of the vertical shaft 300 and the motion of the horizontal shaft 301. More specifically, an incremental encoder will immediately report changes in position, which is an essential capability in some applications. However, it does not report or keep track of absolute position. As a result, the mechanical system monitored by an incremental encoder may have to be moved to a fixed reference point to initialize the position measurement.

In a preferred embodiment, a E6B2-CWZ5B encoder by OMRON, which is an incremental shaft type rotary encoder, is used in the first encoding unit 323 and the second encoding unit 325. Typically, the E6B2-CWZ5B encoder has a diameter of approximately 40 millimeters (mm), a power supply voltage of approximately 12-24 volts(V)DC, a maximum current consumption of approximately 100 milliamps (mA), and a resolution of approximately 1000 pulses/revolution (P/R). The inrush current is approximately 9 amperes (A). When considering the control output of the E6B2-CWZ5B encoder, the output type is a PNP open collector type, the load power supply voltage is approximately 30 VDC, the load current is approximately 35 mA, and the residual voltage is 0.4V. The maximum response frequency is approximately 50 kilohertz (kHz). When the output phases are A, B, and Z, a phase difference on output is 90±45 degrees between A and B. The rise and fall times of the output is approximately 1 microsecond (µs). The starting torque at room temperature is 0.98 millinewton (mN). The moment of intertia is $1*10^{-6}$ kgm$^2$ and radial shaft loading is 30N and thrust shaft loading is 20N. The permissible rotation is approximately 6000 revolutions per minute. The ambient operating temperature is within a range of −10-centigrade (° C.) to 70° C. The ambient storage temperature is within a range of −25° C. to 85° C. The operating ambient humidity is within a range of 35%-85% and the storage ambient humidity is within a range of 35%-85%. The insulation resistance between charged parts and the case at 500 VDC is 20 megaohm (MΩ).

Even though the E6B2-CWZ5B encoder is used in the preferred embodiment, other encoder types that can be, but is not limited to, E6B2-CWZ6C, E6B2-CWZ3E, and E6B2-CWZ1X by OMRON can also be used in the first encoding unit 323 and the second encoding unit 325 in other embodiments of the present disclosure. Other incremental shaft type encoders that can be, but are not limited to, the HS35 heavy duty optical encoder, RIM Tach NexGen RT8 (8500) Magnetic Encoder, and the HA25 Size 25 Shafted Encoder can also be used in other embodiments of the present disclosure. Other incremental shaft encoders that can be, but are not limited to, the model 15S, model 755A, model 702, and the model 758 from the Encoder Products Company can also be used in other embodiments of the present disclosure. Furthermore, other incremental shaft encoders that can be, but are not limited to, the 60 Rotopulser, the 60P Rotopulser, the DWD38, the E12 encoder, and the E14 encoder by Dynapar can also be used with the system of the present disclosure.

The system of the present disclosure further comprises a light-sensor unit 400, at least one microcontroller 401, and at least one proportional-integral-derivative (PID) controller 403. The PID controller 403 may be any type of controller, e.g., an open-loop or closed-loop type controller. The system of the present disclosure can also include a control system, such as an Arduino platform, that analyzes input information to generate moving signals based upon the input information. In a different embodiment, the input information can also be used to generate signals that can be used to control the valves of the present disclosure manually. Preferably, the light-sensor unit 400 is a north-south-east-west light-sensor unit that tracks the position of the sun so that accurate position adjustments can be made to the system of the present disclosure through the vertical shaft 300 and the horizontal shaft 301. The PID controller 403 which is preferably a standard PID controller, combines proportional control with integral and derivative control, which helps the system of the present disclosure to automatically compensate for changes. These adjustments, integral and derivative, are expressed in time-based units; they are also referred to by their reciprocals, RESET and RATE, respectively. The proportional, integral and derivative terms must be individually adjusted or "tuned" to a particular system using trial and error. A pole placement approach or a quadratic regulator approach with compensating pole can be used in determining the PID controller 403 to be used with the system of the present disclosure.

Tuning a control loop of a PID controller is the adjustment of its control parameters (proportional band/gain, integral gain/reset, derivative gain/rate) to the values of the desired control response. Stability (no unbounded oscillation) is a basic requirement, but beyond that, different systems have different behaviors, different applications have different requirements, and requirements may conflict with one another. Analytical approaches and graphical methods can be used for tuning of PID parameters such as root locus, bode plot, and stability boundary locus.

PID controllers often provide acceptable control using default tunings, but performance can generally be improved by careful tuning, and performance may be unacceptable with poor tuning. Usually, initial designs need to be adjusted repeatedly through computer simulations until the closed-loop system performs or compromises as desired.

Some processes have a degree of nonlinearity and so parameters that work well at full-load conditions do not work when the process is starting up from no-load; this can be corrected by gain scheduling by using different parameters in different operating regions. Also, the position angle required, and the angle of the system can be determined using different technologies such as a gyroscopic sensor system referenced to a related position or to a pre-identified point. More sensors such as wind sensors can be used to measure the load effect on the solar panels and that can cause an increase to the pressure required to be applied on the vertical or horizontal shaft 300 or 301. Moreover, a torsional load sensor on the vertical or horizontal shaft 300 or 301 may be used to indicate if the system is overloaded.

Any sensor configuration or system may be used to improve operating energy, safety and monitoring, recording and/or analyzing the data; such as, position vs time log, loaded energy vs solar energy generated, controlling the position option manually or remotely by using corresponding sensors and communication methods such as human machine interface screen and internet networks. Where at least one human machine interface screen contains indication of all signals connected to system such as:
Operating status of all digital inputs and outputs.
Logic state of all digital inputs and outputs.
Engineering trending logs for all analog inputs and outputs.
Operating alarms, such as exceeding the limited operating parameters or failure in the controlling system.

The system can record and carry out the required analysis based on these data and transfer the data to accomplish remote control using a wireless or internet network.

Several internal sensors may be used to safely measure overall operating parameters, including monitoring the pressure inside different pressure points in the hydraulic system, and relief valves and to release trapped pressure inside the system and/or to make sure pressure limits are not exceeded.

The light-sensor unit 400, the at least one microcontroller 401, and the at least one PID controller 403 are electronically connected to each other. Thus, at least one position signal that generated from the light-sensor unit 400 is processed at the at least one microcontroller 401 and then transferred to the at least one PID controller 403. The at least one PID controller 403 is also electronically connected to the first encoding unit 323 and the second encoding unit 325. Thus, the at least one PID controller 403 can receive an azimuth feedback signal from the first encoding unit 323. Moreover, the at least one PID controller 403 can receive an elevation feedback signal from the second encoding unit 325.

In order to adjust the position of the vertical shaft 300 according to the azimuth feedback signal from the first encoding unit 323 and the at least one position signal from the light-sensor unit 400, which corresponds to the east-west position signal, the at least one PID controller 403 is operatively engaged with at least one inlet solenoid control valve 309, which is a high-pressure fluid inlet, and at least one exit solenoid control valve 311, which is a low-pressure fluid exit, of the vertical shaft enclosure 303. Thus, the PID controller 403 can control the opening time and opening duration of the at least one inlet solenoid control valve 309 and the at least one exit solenoid control valve 311. The at least one inlet solenoid control valve 309 and the at least one exit solenoid control valve 311 of the vertical shaft enclosure 303 are operatively engaged with the vertical shaft 300. More specifically, the at least one inlet solenoid control valve 309 and the at least one exit solenoid control valve 311 of the vertical shaft enclosure 303 are used to manage a fluid flow into the vertical shaft enclosure 303 and to manage a pressure value within the vertical shaft enclosure 303.

Figure 7:
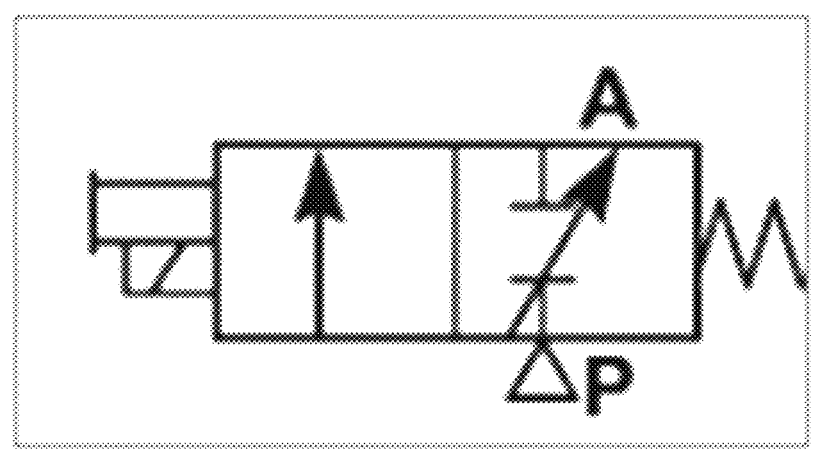
FIG. 7 is an illustration of a solenoid control valve.

Similarly, in order to adjust the position of the horizontal shaft 301 according to the elevation feedback signal from the second encoding unit 325 and the at least one position signal from the light-sensor unit 400, which corresponds to a north-south position, the at least one PID controller 403 is operatively engaged with at least one inlet solenoid control valve 319, which is a high-pressure fluid inlet, and at least one exit solenoid control valve 321, which is a low-pressure fluid exit, of the horizontal shaft enclosure 313. Thus, the PID controller 403 can control the opening time and opening duration of the at least one inlet solenoid control valve 319 and the at least one exit solenoid control valve 321. The at least one inlet solenoid control valve 319 and the at least one exit solenoid control valve 321 of the horizontal shaft enclosure 313 are operatively engaged with the horizontal shaft 301. More specifically, the at least one inlet solenoid control valve 319 and the at least one exit solenoid control valve 321 of the horizontal shaft enclosure 313 are used to manage a fluid flow into the horizontal shaft enclosure 313 and to manage a pressure value within the horizontal shaft enclosure 313. FIG. 7 is an illustration of a solenoid control valve that can be used as the inlet valve or as the exit valve of either the vertical shaft enclosure or the horizontal shaft enclosure. In a preferred embodiment, the solenoid control valve is held in a closed position by a spring until the earth circuit is completed by the microcontroller 401. In other embodiments, different types of solenoid control valves that can be, but are not limited to, direct acting valves, pilot-operated valves, two way valves, three way valves, and four way valves can be used. Other valves such as variable flow control valves or electro-pneumatic valves can be controlled by electrical control system.

In order to control the fluid flow into the vertical shaft enclosure 303 and the horizontal shaft enclosure 313, and to control the pressure value within the vertical shaft enclosure 303 and the horizontal shaft enclosure 313, the hydraulic system 600 comprises a receiver tank 601, a hydraulic pump 603, and an accumulator 605. In order to fulfill the intended functionalities of the hydraulic system 600, the receiver tank 601, which stores the hydraulic fluid protecting it from contamination, is in fluid communication with the hydraulic pump 603 and the accumulator 605. As described earlier, the accumulator 605 pressurizes a hydraulic fluid used within the hydraulic system 600 via an air compressor. The compressed hydraulic fluid is used as energy to activate the at least one inlet solenoid control valve 319 and the at least one exit solenoid control valve 321 of the horizontal shaft enclosure 313, and the at least one inlet solenoid control valve 309 and the at least one exit solenoid control valve 311 of the vertical shaft enclosure 303. The accumulator 605, which holds the hydraulic fluid under pressure, is in fluid communication with the at least one inlet solenoid control valve 309 and the at least one exit solenoid control valve 311 of the vertical shaft enclosure 303. Thus, the rotational movement of the vertical shaft 300 can be controlled. In particular, a hydraulic pressure force of the pressurized hydraulic fluid entering the vertical shaft enclosure 303 enables the rotational movement of the vertical shaft 300. Moreover, the hydraulic pressure is also used to control the open/close locking position of both the at least one inlet solenoid control valve 309 and the at least one exit solenoid control valve 311 of the vertical shaft enclosure 303. The accumulator 605 is also in fluid communication with the at least one inlet solenoid control valve 319 and the at least one exit solenoid control valve 321 of the horizontal shaft enclosure 313. Thus, the rotational movement of the horizontal shaft 301 can be controlled. In particular, a hydraulic pressure force of the pressurized hydraulic fluid entering the horizontal shaft enclosure 313 enables the rotational movement of the horizontal shaft 301. The hydraulic pressure is also used to control the open/close locking position of both the at least one inlet solenoid control valve 319 and the at least one exit solenoid control valve 321 of the horizontal shaft enclosure 313. As described earlier and as illustrated in FIG. 5, the vertical shaft 300 corresponds to a yaw rotation and the horizontal shaft 301 corresponds to a pitch rotation. The hydraulic pump 603, can be, but is not limited to a fixed displacement type or a variable displacement type. Moreover, if the hydraulic pump 603 is a fixed displacement type, the hydraulic pump 603 can be, but is not limited to, a gear pump, a gerotor pump, or a screw pump. On the other hand, if the hydraulic pump 603 is a variable displacement type, the hydraulic pump can be, but is not limited to, a bent axis hydraulic pump, an axial piston pump, a rotary vane pump or a radial piston pump.

As described earlier, the overall shape and size of the vertical shaft enclosure 303 and the horizontal shaft enclosure 313 can vary. In a preferred embodiment, the vertical shaft enclosure 303, comprises a first lid portion 305 and a second lid portion 307. Even though the lid portions have a semi-circular shape in a preferred embodiment, the shapes of the lid portions of the vertical shaft enclosure can vary in shape in other embodiments of the present disclosure. The first lid portion 305 is removably attached to the second lid portion 307 such that the vertical shaft 300 is rotatably positioned in between the first lid portion 305 and the second lid portion 307.

On the other hand, the horizontal shaft enclosure 313, comprises a base portion 315 and a top lid portion 317 in the preferred embodiment. The base portion 315 is removably attached to the top lid portion 317 such that the horizontal shaft 301 is rotatably positioned in between the base portion 315 and the top lid portion 317.

The system of the present disclosure further comprises a vertical-axis rotating panel 327 that is used to transfer the rotational motion from the vertical shaft 300. To do so, the vertical-axis rotating panel 327 is terminally connected to the vertical shaft 300 opposite the first encoding unit 323. The system of the present disclosure further comprises a horizontal-axis rotating panel 329 that is terminally connected to the horizontal shaft 301 opposite the second encoding unit 325. Similar to the vertical-axis rotating panel 327, the horizontal-axis rotating panel 329 is used to transfer the rotational motion of the horizontal shaft 301. When considering the overall positioning, the vertical-axis rotating panel 327 is positioned in between the vertical shaft enclosure 303 and the horizontal shaft enclosure 313. Therefore, the rotational movement of the vertical shaft 300 is transferred onto the horizontal shaft enclosure 313.

When the system of the present disclosure is used for solar panel direction control, wherein the solar panels are oriented via the rotational movement of the vertical shaft 300 and the horizontal shaft 301, the system of the present disclosure further comprises at least one first solar panel and at least one second solar panel. The at least one first solar panel is attached to the vertical shaft enclosure 303 at the first encoding unit 323 through a first set of radial bearings 335 and a first set of thrust bearings 337. Similarly, at least one second solar panel is attached to the horizontal shaft enclosure 313 at the second encoding unit 325 through a second set of radial bearings 339 and a second set of thrust bearings 341. In a preferred embodiment, the first set of radial bearings 335 and the second set of radial bearings 339 are 68-attometer (am) radial ball bearings. Moreover, in a preferred embodiment, the first set of thrust bearings 337 and the second set of thrust bearings 341 are 68 am thrust ball bearings. The use of the first set of radial bearings 335, the first set of thrust bearings 337, the second set of radial bearings 339, and the second set of thrust bearings 341 ensure that the device of the present disclosure can hold the at least one first solar panel and the at least one second solar panel against varying hydraulic forces. In a different embodiment of the present disclosure, the type of bearings used to attach the at least one first solar panel and the at least one second solar panel can be, but is not limited to, tapered bearings.

When the system of the present disclosure is in use, the at least one PID controller 403 initially receives at least one position signal from the light-sensor unit 400, wherein the at least one position signal corresponds to an east-west position. The at least one position signal provides information regarding the position required for the solar panels used with the system of the present disclosure. In the process of determining the position for the solar panels used with the system of the present disclosure, the at least one PID controller 403 generates a first desired solar tracking position based upon the at least one position signal corresponding to the east-west position. Next, when the azimuth feedback signal is received from the first encoding unit 323, the at least one PID controller 403 proceeds to calculate a vertical shaft error value between the first desired solar tracking position and a first angular coordinate, wherein the first angular coordinate is derived from the azimuth feedback signal. After the vertical shaft error value is calculated, a first correction process is performed through the at least one PID controller 403. The purpose of the first correction process is to adjust the first angular coordinate to match the first desired solar tracking position.

As a step of the first correction process, the at least one inlet solenoid control valve 309 or the at least one exit solenoid control valve 311 is controlled through the at least one PID controller 403. For example, if forward motion is required, the at least one inlet solenoid control valve 309 of the vertical shaft enclosure 303 is opened. In contrast, if reverse motion is required, the at least one exit solenoid control valve 311 of the vertical shaft enclosure 303 is opened to release pressure from within the vertical shaft enclosure 303 and thus, reversing the rotational motion of the vertical shaft 300.

Similar to receiving the at least one position signal corresponding to the east-west position, the at least one PID controller 403 also receives at least one position signal corresponding to a north-south position. As described earlier, the at least one position signal provides information regarding the position required for the solar panels used with the system of the present disclosure. The at least one PID controller 403 generates a second desired solar tracking position based upon the at least one position signal corresponding to the north-south position. Next, when the elevation feedback signal is received from the second encoding unit 325, the at least one PID controller 403 proceeds to calculate a horizontal shaft error value between the second desired solar tracking position and a second angular coordinate, wherein the second angular coordinate is derived from the elevation feedback signal. After the horizontal shaft error value is calculated, a second correction process is performed through the at least one PID controller 403. The purpose of the second correction process is to adjust the second angular coordinate to match the second desired solar tracking position. For instance, if forward motion is required, the at least one inlet solenoid control valve 319 of the horizontal shaft enclosure 313 is opened. In contrast, if reverse motion is required, the at least one exit solenoid control valve 321 of the horizontal shaft enclosure 313 is opened to release pressure from within the vertical shaft enclosure 303 and thus, reversing the rotational motion of the horizontal shaft 301.

By implementing the system of the present disclosure, sources of stress concentration points can be eliminated. As a result, fatigue failure can be eliminated which in turn reduces the need for part maintenance and replacement. The use of the hydraulic system 600 permits the system to be self-locking without the use of internal or external locking mechanisms that consume energy to maintain a self-locking state. Furthermore, the use of the hydraulic system 600 minimizes the overall use of material and with no hindrance to the overall strength of a developed joint.

When comparing the hydraulic joint described in the present disclosure with traditional motor/gear joints, utilizing the hydraulic joint is advantageous in terms of actuation energy, the ability to self-lock, maintenance, part replacement, part failure, overall weight of components, and cost of manufacturing. Traditional gears/motors are comparatively easy to manufacture when compared with hydraulic joints. The system of the present disclosure provides advantages in comparison to conventional systems considering the limitations of the operating equipment available in the market and corresponding operating standards, e.g., where one inlet solenoid control valve handles the required hydraulic pressure to rotate the shaft and any additional load on the panels because of the wind additional to the load safety factor.

The syringe and motor combination are used for the self-locking feature. The syringe mechanism simulates the ability to transmit hydraulic power into rotational one axis. This can also apply to the other shaft. The system of the present disclosure conserves energy through the self-locking feature and also by controlling the fluid flow. A self-locking feature using the sealed pressurized chamber and one inlet solenoid control valves, beside the closed hydraulic pressure system is also provided. In order to do so, a large diameter cylinder is used to supply the hydraulic fluid to the dual-axis joint which has a smaller surface area. The difference in surface areas means that minimal motor actuation is required to move a large amount of hydraulic fluid that actuates the dual-axis joint in a desired angle or location. The design not only of the shaft but also all parts of the present disclosure, e.g., dimensions or the geometry and the pressurized area, are all based on the application loads and the material of manufacturing and the stress analysis simulation.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

Obviously, numerous modifications and variations of the present invention are possible in light of the above teachings. It is therefore to be understood that within the scope of the appended claims, the invention may be practiced otherwise than as specifically described herein.

The invention claimed is:
1. A photovoltaic (PV) module, comprising:
one or more PV panels, a hydraulic system, and
a dual-axis hydraulic joint system as a steering mechanism,
wherein the dual-axis hydraulic joint system comprises:
a vertical shaft;
a horizontal shaft;

the vertical shaft being rotatably positioned within a vertical shaft enclosure;

the horizontal shaft being rotatably positioned within a horizontal shaft enclosure;

a first encoding unit being operatively coupled to the vertical shaft, wherein a pressure applied on the vertical shaft within the vertical shaft enclosure corresponds to a position of the vertical shaft, wherein the pressure within the vertical shaft enclosure is managed by the hydraulic system based on a feedback signal from the first encoding unit;

a second encoding unit being terminally connected to the horizontal shaft, wherein a pressure applied on the horizontal shaft within the horizontal shaft enclosure corresponds to a position of the horizontal shaft, wherein the pressure within the horizontal shaft enclosure is managed by the hydraulic system based on a feedback signal from the second encoding unit; and the vertical shaft enclosure and the horizontal shaft enclosure being mechanically engaged to each other, a light-sensor unit, wherein the light-sensor unit is a north-south-east-west light-sensor unit;

at least one microcontroller;

at least one proportional-integral-derivative (PID) controller;

the light-sensor unit, the at least one microcontroller, and the at least one PID controller being electronically connected to each other;

the at least one PID controller being electronically connected to the first encoding unit and the second encoding unit the at least one PID controller being operatively engaged with at least one inlet solenoid control valve and at least one exit solenoid control valve of the vertical shaft enclosure, wherein the at least one inlet solenoid valve and the at least one exit solenoid valve are operatively engaged with the vertical shaft and manage a pressure value within the vertical shaft enclosure; and the at least one PID controller being operatively engaged with at least one inlet solenoid control valve and at least one exit solenoid control valve of the horizontal shaft enclosure, wherein the at least one inlet solenoid valve and the at least one exit solenoid valve are operatively engaged with the horizontal shaft and manage a pressure value within the horizontal shaft enclosure.

2. The PV module of claim 1, wherein at least one position signal from the light-sensor unit corresponds to an east-west position.

3. The PV module of claim 1, wherein the first encoding unit transfers an azimuth feedback signal to the at least one PID controller.

4. The PV module of claim 1, wherein at least one position signal from the light-sensor unit corresponds to a north-south position.

5. The PV module of claim 4, wherein the second encoding unit transfers an elevation feedback signal to the at least one PID controller.

6. The PV module of claim 1, wherein
the hydraulic system comprises a receiver tank, a hydraulic pump, and an accumulator;
wherein the accumulator pressurizes a hydraulic fluid via an air compressor to be stored as energy;
the receiver tank, the hydraulic pump, and the accumulator being in fluid communication with each other;

the accumulator being in fluid communication with at least one inlet solenoid control valve and at least one exit solenoid control valve of the vertical shaft enclosure, wherein a hydraulic pressure force of the pressurized hydraulic fluid entering the vertical shaft enclosure enables rotational movement of the vertical shaft, wherein an open/close locking position of both the at least one inlet solenoid control valve and the at least one exit solenoid control valve of the vertical shaft enclosure are controlled by the hydraulic pressure; and the accumulator being in fluid communication with at least one inlet solenoid control valve and at least one exit solenoid control valve of the horizontal shaft enclosure, wherein a hydraulic pressure force of the pressurized hydraulic fluid entering the horizontal shaft enclosure enables rotational movement of the horizontal shaft, wherein an open/close locking position of both the at least one inlet solenoid control valve and the at least one exit solenoid control valve of the horizontal shaft enclosure are controlled by the hydraulic pressure.

7. The PV module of claim 1, wherein the vertical shaft corresponds to a yaw rotation.

8. The PV module of claim 1, wherein the horizontal shaft corresponds to a pitch rotation.

9. The PV module of claim 1 further comprising:
the vertical shaft enclosure comprises a first lid portion and a second lid portion;
the first lid portion being removably attached to the second lid portion; and
the vertical shaft being rotatably positioned in between the first lid portion and the second lid portion.

10. The PV module of claim 1 further comprising:
the horizontal shaft enclosure comprises a base portion and a top lid portion;
the base portion being removably attached to the top lid portion; and
the horizontal shaft being rotatably positioned in between the base portion and the top lid portion.

11. The PV module of claim 1 further comprising:
a vertical-axis rotating panel;
a horizontal-axis rotating panel;
the vertical-axis rotating panel being terminally connected to the vertical shaft opposite the first encoding unit;
the horizontal-axis rotating panel being terminally connected to the horizontal shaft opposite the second encoding unit; and
the vertical-axis rotating panel being positioned in between the vertical shaft enclosure and the horizontal shaft enclosure.

12. A method of solar tracking with a photovoltaic (PV) module with one or more PV panels, a hydraulic system, and a dual-axis hydraulic joint system as a steering mechanism, comprising:
wherein a vertical shaft is rotatably positioned within a vertical shaft enclosure;
wherein a horizontal shaft is rotatably positioned within a horizontal shaft enclosure;
wherein the vertical shaft enclosure and the horizontal shaft enclosure is mechanically engaged to each other;
receiving, through at least one proportional-integral-derivative (PID) controller, at least one position signal from a light-sensor unit corresponding to an east-west position;

generating, through the at least one PID controller, a first desired solar tracking position, wherein the first desired solar tracking position corresponds to the at least one position signal corresponding to the east-west position;

receiving, at the at least one PID controller, an azimuth feedback signal from a first encoding unit;

calculating, through the at least one PID controller, a vertical shaft error value between the first desired solar tracking position and a first angular coordinate, wherein the first angular coordinate is derived from the azimuth feedback signal;

performing a first correction process, through the at least one PID controller, to match the first angular coordinate of the vertical shaft with the first desired solar tracking position;

receiving, at the at least one PID controller, at least one position signal from a light-sensor unit corresponding to a north-south position;

generating, through the at least one PID controller, a second desired solar tracking position, wherein the second desired solar tracking position corresponds to the feedback signal corresponding to the north-south position;

receiving, at the at least one PID controller, an elevation feedback signal from a second encoding unit;

calculating, through the at least one PID controller, a horizontal shaft error value between the desired solar tracking position and a second angular coordinate, wherein the second angular coordinate is derived from the elevation feedback signal; and performing a second correction process, through the at least one PID controller, to match the second angular coordinate of the horizontal shaft with the second desired solar tracking position.

13. The method of claim 12, wherein at least one inlet solenoid control valve of the vertical shaft enclosure is controlled through the at least one PID controller in the first correction process.

14. The method of claim 12, wherein at least one exit solenoid control valve of the vertical shaft enclosure is controlled through the at least one PID controller in the first correction process.

15. The method of claim 12, wherein at least one inlet solenoid control valve of the horizontal shaft enclosure is controlled through the at least one PID controller in the second correction process.

16. The method of claim 12, wherein at least one exit solenoid control valve of the horizontal shaft enclosure is controlled through the at least one PID controller in the second correction process.

17. The method of claim 12, wherein the first encoding unit and the second encoding unit are rotary encoders.

* * * * *